(12) United States Patent
Kim

(10) Patent No.: US 11,327,716 B2
(45) Date of Patent: May 10, 2022

(54) ARITHMETIC CIRCUIT

(71) Applicant: SK hynix Inc., Icheon-si (KR)

(72) Inventor: Chang Hyun Kim, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 17/147,884

(22) Filed: Jan. 13, 2021

(65) Prior Publication Data

US 2021/0389929 A1 Dec. 16, 2021

(30) Foreign Application Priority Data

Jun. 10, 2020 (KR) .................... 10-2020-0070478

(51) Int. Cl.
*G06F 7/50* (2006.01)
(52) U.S. Cl.
CPC ....................... *G06F 7/50* (2013.01)
(58) Field of Classification Search
CPC ...... G06F 7/50; G06F 7/501; G06F 2207/482; G06F 2207/4802; G06F 2207/4806; G06F 2207/4818
USPC ................. 708/700, 701, 702, 703
See application file for complete search history.

(56) References Cited

U.S. PATENT DOCUMENTS

| | | | |
|---|---|---|---|
| 4,685,079 A | 8/1987 | Armer | |
| 5,818,747 A * | 10/1998 | Wong | G06F 7/5045 708/702 |
| 8,407,277 B1 * | 3/2013 | Das | G06F 7/501 708/705 |
| 2005/0198094 A1 * | 9/2005 | Wallace | G06F 7/506 708/700 |
| 2015/0019610 A1 * | 1/2015 | Kim | G06F 7/501 708/702 |

OTHER PUBLICATIONS

P. Sharma et al., Design and Analysis of Area and Power Efficient 1-Bit Full Subtractor using 120nm Technology, International Journal of Computer Applications (0975-8887), vol. 88—No. 12, 2014 (Year: 2014).*

* cited by examiner

*Primary Examiner* — Emily E Larocque
(74) *Attorney, Agent, or Firm* — William Park & Associates Ltd.

(57) ABSTRACT

An arithmetic circuit includes an arithmetic driving circuit and a detection circuit. The arithmetic driving circuit is configured to generate an arithmetic result value based on first and second arithmetic target values. The detection circuit is configured to detect whether an upper borrow digit value occurs, by receiving the arithmetic result value as feedback.

13 Claims, 6 Drawing Sheets

| X | Y | BI | YB | V1 | V2 | DB | D | BO |
|---|---|----|----|----|----|----|---|----|
| 0 | 0 | 0  | 1  | 0  | 1  | 1  | 0 | 0  |
| 0 | 0 | 1  | 1  | 0  | 1  | 0  | 1 | 1  |
| 0 | 1 | 0  | 0  | 1  | 0  | 0  | 1 | 1  |
| 0 | 1 | 1  | 0  | 1  | 0  | 1  | 0 | 1  |
| 1 | 0 | 0  | 1  | 1  | 0  | 0  | 1 | 0  |
| 1 | 0 | 1  | 1  | 1  | 0  | 1  | 0 | 0  |
| 1 | 1 | 0  | 0  | 0  | 1  | 1  | 0 | 0  |
| 1 | 1 | 1  | 0  | 0  | 1  | 0  | 1 | 1  |

ARITHMETIC CIRCUIT

CROSS-REFERENCES TO RELATED APPLICATION

The present application claims priority under 35 U.S.C. § 119(a) to Korean application number 10-2020-0070478, filed on Jun. 10, 2020, in the Korean Intellectual Property Office, which is incorporated herein by reference in its entirety.

BACKGROUND

1. Technical Field

Various embodiments generally relate to an arithmetic circuit, and particularly, to an arithmetic circuit capable of performing an arithmetic operation through a logic operation.

2. Related Art

In general, an arithmetic circuit is divided into an adder that performs an addition on two input values and a subtractor that performs a subtraction on two input values. In this case, the subtractor is divided into a half subtractor and a full subtractor. The half subtractor is capable of performing a subtraction for an input value having two bits. The full subtractor is capable of performing a subtraction for an input value having two bits by considering borrowing occurring in a lower bit.

FIGS. 1 and 2 are diagrams illustrating configurations of existing full subtractors.

The full subtractor of FIG. 1 is configured with first and second XOR gates XOR1 and XOR2, first and second inverters INV1 and INV2, first and second AND gates AND1 and AND2, and an OR gate OR. The full subtractor of FIG. 2 is configured with first and second XOR gates XOR1, and XOR2, an inverter INV, first to third AND gates AND1, AND2, and AND3, and an OR gate OR.

Each of the full subtractors of FIGS. 1 and 2 may receive a minuend value X, a subtrahend value Y, and a borrow digit value BI required for a lower bit based on a currently calculated cipher, and may output an arithmetic result value D of the minuend value X and the subtrahend value Y and a borrow digit value BO delivered as an upper bit based on the currently calculated cipher.

In this case, the full subtractor of FIG. 1 has a higher operation speed than the full subtractor of FIG. 2. The reason why the full subtractor of FIG. 1 has the higher operation speed is that the number of internal circuits of the full subtractor of FIG. 1 is smaller than the number of internal circuits of the full subtractor of FIG. 2.

These days, it is desirable for semiconductor devices to have high operation speeds. An arithmetic circuit is a circuit typically mounted on a semiconductor device. Therefore, the operation speed of the arithmetic circuit is directly related to an overall operation speed of the semiconductor device.

SUMMARY

Various embodiments are directed to an arithmetic circuit having a reduced number of internal circuits.

Objects of the present disclosure are not limited to the aforementioned objects, and other objects not described above may be evidently understood by those skilled in the art, to which the present disclosure pertains, from the following description.

In an embodiment, an arithmetic circuit may include an arithmetic driving circuit configured to generate an arithmetic result value based on first and second arithmetic target values and a lower borrow digit value. The arithmetic circuit may also include a detection circuit configured to detect whether an upper borrow digit value occurs based on the fed-back arithmetic result value, the second arithmetic target value, and an intermediate result value of the arithmetic driving circuit.

In an embodiment, an arithmetic circuit may include an arithmetic driving circuit configured to generate an arithmetic result value based on first and second arithmetic target values and a lower borrow digit value. The arithmetic circuit may also include a detection circuit configured to receive an inverted second arithmetic target value and an intermediate result value generated within the arithmetic driving circuit and to detect whether an upper borrow digit value occurs, based on the inverted arithmetic result value received as feedback and corresponding to the arithmetic result value.

DETAILED DESCRIPTION

The description of the present disclosure includes embodiments for a structural and/or functional description. The scope of rights of the present disclosure should not be construed as being limited to embodiments described in the specification. That is, the scope of rights of the present disclosure should be understood as including equivalents, which may realize the technical spirit, because an embodiment may be modified in various ways and may have various forms. Furthermore, objects or effects proposed in the present disclosure do not mean that a specific embodiment should include all objects or effects or include only such effects. Accordingly, the scope of rights of the present disclosure should not be understood as being limited thereby.

The meaning of terms described in this application should be understood as follows.

Terms, such as the "first" and the "second," are used to distinguish one element from another element, and the scope of rights of the present disclosure should not be limited by the terms. For example, a first element may be named a second element. Likewise, the second element may be named the first element.

A singular expression should be understood as also including a plural expression, unless clearly expressed otherwise in the context. Terms, such as "include" or "have," should be understood as indicating the existence of a set characteristic, number, step, operation, element, part, or a combination thereof, not excluding a possibility of the existence or addition of one or more other characteristics, numbers, steps, operations, elements, parts, or a combination thereof.

For steps, symbols (e.g., a, b, and c) are used for identification and convenience of a description. The symbols do not imply an order of the steps. The steps may be performed in an order different from the order described in the context unless a specific order is clearly described in the context. That is, the steps may be performed according to described order, may be performed substantially at the same time as the described order, or may be performed in reverse order of the described order.

All the terms used herein, including technological or scientific terms, have the same meanings as those that are typically understood by those skilled in the art, unless otherwise defined. Terms defined in commonly used dictionaries should be construed as having the same meanings as those in the context in related technology and should not be construed as having ideal or excessively formal meanings, unless clearly defined in the application.

Figure 1:
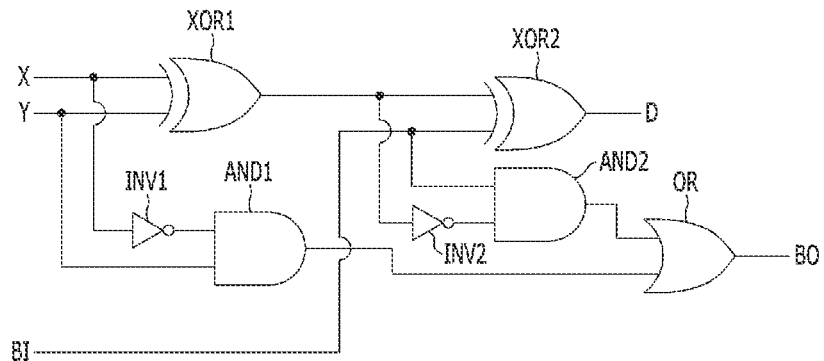
FIGS. 1 and 2 are diagrams illustrating configurations of existing full subtractors.
Figure 2:
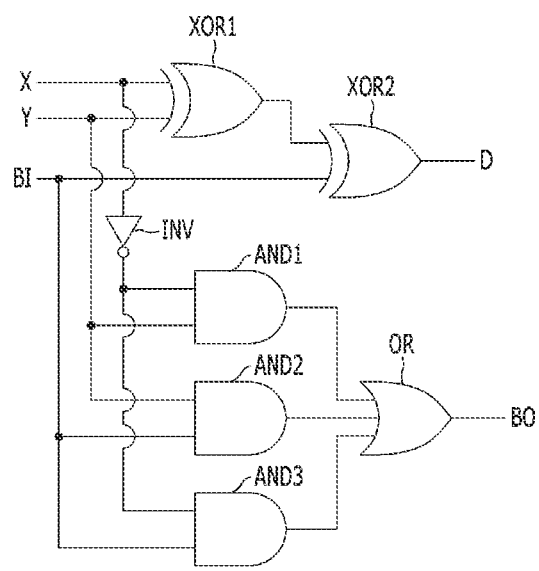
Figure 3:
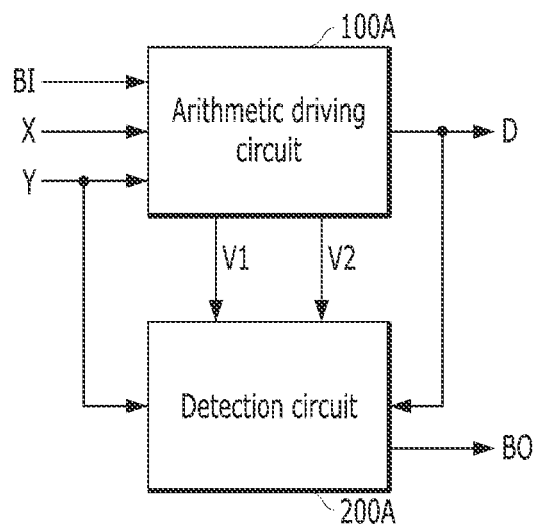
FIG. 3 is a block diagram illustrating a configuration of an arithmetic circuit according to an embodiment.

FIG. 3 is a block diagram illustrating a configuration of an arithmetic circuit according to an embodiment.

Referring to FIG. 3, the arithmetic circuit may include an arithmetic driving circuit 100A and a detection circuit 200A.

First, the arithmetic driving circuit 100A may be an element for generating an arithmetic result value D based on a first arithmetic target value X, a second arithmetic target value Y, and a lower borrow digit value BI. In this case, the first arithmetic target value X may correspond to a minuend value. The second arithmetic target value Y may correspond to a subtrahend value. The lower borrow digit value BI may correspond to a borrow digit value required for a lower bit based on a currently calculated cipher. The arithmetic driving circuit 100A may generate first and second intermediate result values V1 and V2 and provide the first and second intermediate result values V1 and V2 to the detection circuit 200A. As will be described later with reference to FIG. 5, the first and second intermediate result values V1 and V2 may be signals generated within the arithmetic driving circuit 100A.

The detection circuit 200A may be an element for detecting whether an upper borrow digit value BO occurs, based on the arithmetic result value D received as feedback, the second arithmetic target value Y, and the first and second intermediate result values V1 and V2, that is, intermediate result values of the arithmetic driving circuit 100A. In this case, the upper borrow digit value BO may correspond to a borrow digit value transferred as an upper bit based on a currently calculated cipher. For example, when the upper borrow digit value BO is "1," this may mean that a borrow digit value transferred as an upper bit has occurred. When the upper borrow digit value BO is "0," this may mean that a borrow digit value transferred as an upper bit has not occurred.

An arithmetic circuit according to an embodiment may include the arithmetic driving circuit 100A and the detection circuit 200A. In this case, the arithmetic driving circuit 100A may internally generate the first and second intermediate result values V1 and V2 used to generate the arithmetic result value D. Furthermore, the detection circuit 200A may have a structure for generating the upper borrow digit value BO by receiving the second arithmetic target value Y and the first and second intermediate result values V1 and V2 generated by the arithmetic driving circuit 100A, and the arithmetic result value D received as feedback. As will be described later again, the arithmetic circuit according to an embodiment has a small number of internal circuits, and thus can achieve faster operation speed corresponding to the small number of internal circuits.

Figure 4:
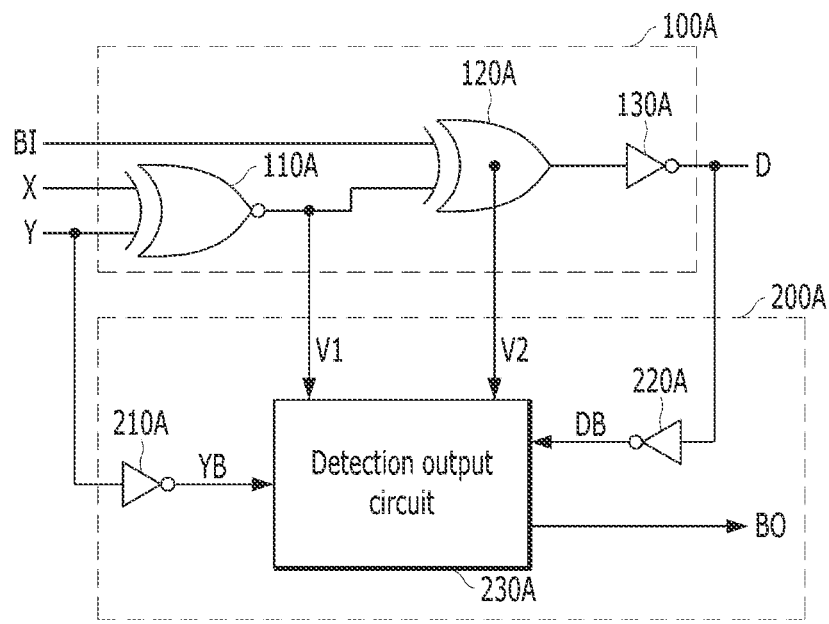
FIG. 4 is a diagram illustrating a configuration of some logic gates of the arithmetic circuit of FIG. 3.

FIG. 4 is a diagram illustrating a configuration of some logic gates of the arithmetic circuit of FIG. 3.

Referring to FIG. 4, the arithmetic driving circuit 100A may be an element for generating the arithmetic result value D based on the first arithmetic target value X, the second arithmetic target value Y, and the lower borrow digit value BI. The arithmetic driving circuit 100A may include an exclusive NOR (XNOR) gate circuit 110A, an XOR gate circuit 120A, and an arithmetic output circuit 130A.

First, the XNOR gate circuit 110A may be an element for receiving the first arithmetic target value X and the second arithmetic target value Y and outputting the first intermediate result value V1 by performing an XNOR logic operation on the first arithmetic target value X and the second arithmetic target value Y. The XOR gate circuit 120A may be an element for receiving the first intermediate result value V1, that is, an output value of the XNOR gate circuit 110A, and the lower borrow digit value BI and outputting an output value by performing an XOR logic operation on the first intermediate result value V1 and the lower borrow digit value BI. As will be described later with reference to FIG. 5, the XOR gate circuit 120A may internally generate the second intermediate result value V2. The arithmetic output circuit 130A may be an element for receiving the output value of the XOR gate circuit 120A and outputting the arithmetic result value D by inverting the output value.

The detection circuit 200A may be an element for detecting whether the upper borrow digit value BO occurs, based on the second arithmetic target value Y, the first intermediate result value V1, the second intermediate result value V2, and the arithmetic result value D received as feedback. The detection circuit 200A may include a first input circuit 210A, a second input circuit 220A, and a detection output circuit 230A.

First, the first input circuit 210A may be an element for receiving the second arithmetic target value Y and outputting an inverted second arithmetic target value YB by inverting the received second arithmetic target value Y. The second input circuit 220A may be an element for receiving the arithmetic result value D and outputting an inverted arithmetic result value DB by inverting the received arithmetic result value D. The detection output circuit 230A may be an element for generating the upper borrow digit value BO based on the inverted second arithmetic target value YB, the first intermediate result value V1, the second intermediate result value V2, and the inverted arithmetic result value DB.

Figure 5:
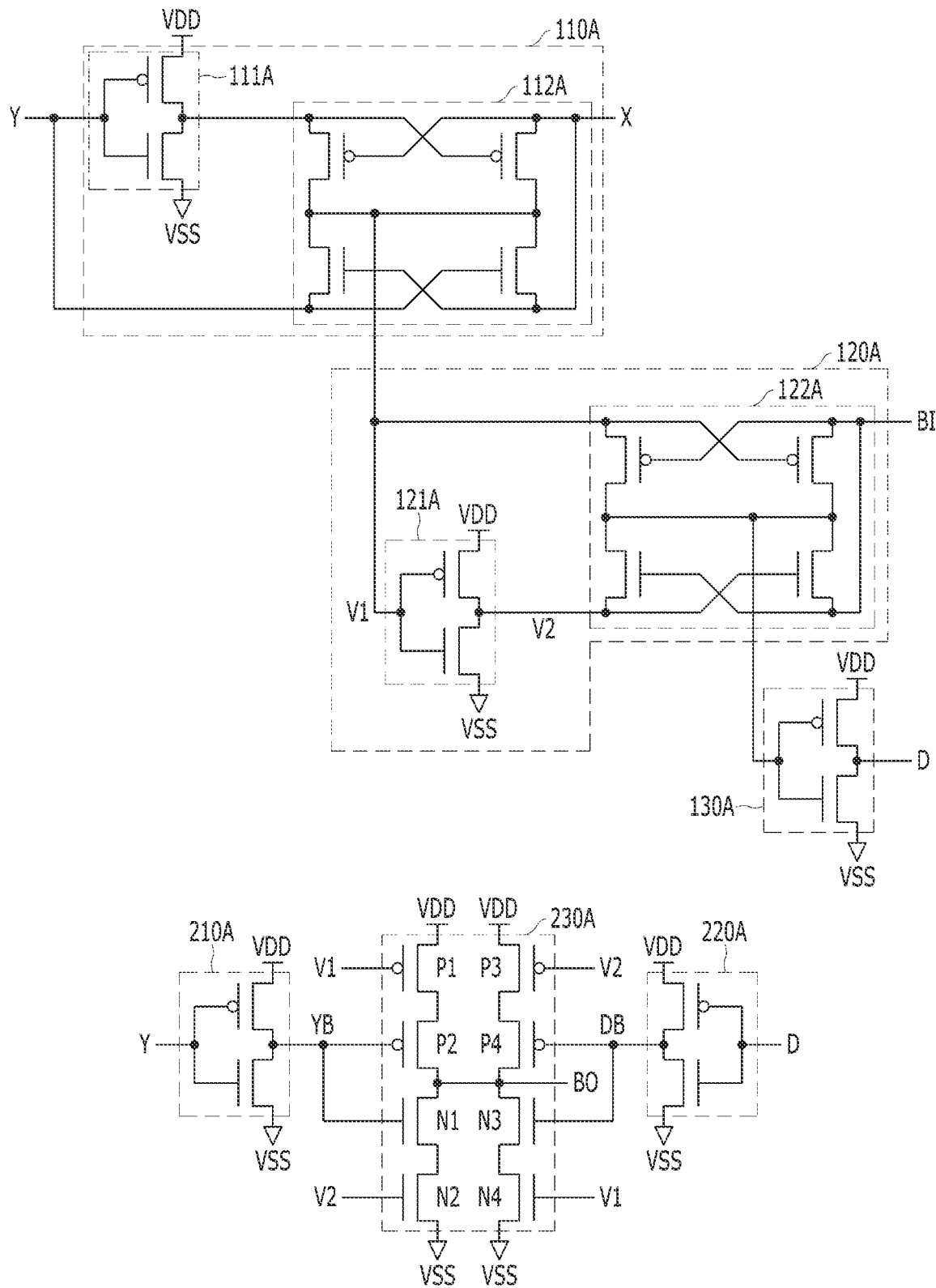
FIG. 5 is a circuit diagram illustrating configurations of internal circuits of the arithmetic circuit of FIG. 4.

FIG. 5 is a circuit diagram illustrating configurations of internal circuits of the arithmetic circuit of FIG. 4.

Referring to FIGS. 4 and 5, the arithmetic driving circuit 100A of the arithmetic circuit may include the XNOR gate circuit 110A, the XOR gate circuit 120A, and the arithmetic output circuit 130A.

First, the XNOR gate circuit 110A may include a first inversion circuit 111A and a first comparison circuit 112A. In this case, the first inversion circuit 111A may receive the second arithmetic target value Y, and may output an output value by inverting the received second arithmetic target value Y. The first comparison circuit 112A may output the first intermediate result value V1 by logically comparing the output value of the first inversion circuit 111A and the first and second arithmetic target values X and Y. The XOR gate circuit 120A may include a second inversion circuit 121A and a second comparison circuit 122A. In this case, the second inversion circuit 121A may receive the first intermediate result value V1, and may output the second intermediate result value V2 by inverting the received first intermediate result value V1. The second comparison circuit 122A may output a result value by logically comparing the first and second intermediate result values V1 and V2 and the lower borrow digit value BI. The arithmetic output circuit 130A may output the arithmetic result value D by inverting the result value output by the XOR gate circuit 120A.

The detection circuit 200A of the arithmetic circuit may include the first input circuit 210A, the second input circuit 220A, and the detection output circuit 230A.

First, the first input circuit 210A may output the inverted second arithmetic target value YB by inverting the second arithmetic target value Y. The second input circuit 220A may output the inverted arithmetic result value DB by inverting the arithmetic result value D. The detection output circuit 230A may detect the upper borrow digit value BO based on the first intermediate result value V1, the second arithmetic target value YB, the second intermediate result value V2, and the inverted arithmetic result value DB.

More specifically, the detection output circuit 230A may include a first PMOS transistor P1, a second PMOS transistor P2, a first NMOS transistor N1, and a second NMOS transistor N2 coupled in series between a power supply voltage stage VDD and a ground voltage stage VSS. Furthermore, the detection output circuit 230A may include a third PMOS transistor P3, a fourth PMOS transistor P4, a third NMOS transistor N3, and a fourth NMOS transistor N4 coupled in series between the power supply voltage stage VDD and the ground voltage stage VSS.

In this case, the first PMOS transistor P1 may receive the first intermediate result value V1 through a gate thereof. The second PMOS transistor P2 may receive the inverted second arithmetic target value YB through a gate thereof. Furthermore, the first NMOS transistor N1 may receive the inverted second arithmetic target value YB. The second NMOS transistor N2 may receive the second intermediate result value V2. Furthermore, the third PMOS transistor P3 may receive the second intermediate result value V2. The fourth PMOS transistor P4 may receive the inverted arithmetic result value DB. Furthermore, the third NMOS transistor N3 may receive the inverted arithmetic result value DB. The fourth NMOS transistor N4 may receive the first intermediate result value V1. The drains of the second PMOS transistor P2 and the fourth PMOS transistor P4 may be coupled to a common node. Furthermore, the detection output circuit 230A may output the upper borrow digit value BO through the common node.

Hereinafter, an inverter configured with one PMOS transistor and one NMOS transistor is defined as one unit number, for convenience of description. As may be seen from FIG. 5, the arithmetic circuit can achieve fast operation speed because it may be configured with the 13 inverters.

The arithmetic circuit according to an embodiment can achieve a higher operation speed by reducing or minimizing the number of internal circuits. Furthermore, the area occupied by the arithmetic circuit can be reduced or minimized because the number of internal circuits used for the arithmetic circuit is reduced or minimized.

Figures 6, 7:
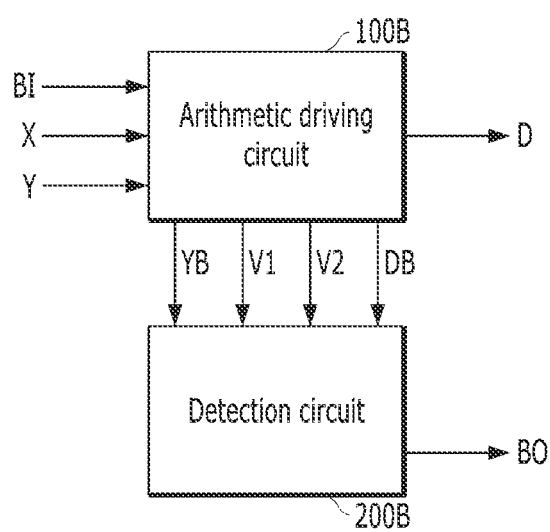
FIG. 6 is a logic table illustrating values input to and output from internal circuits of FIG. 5.
FIG. 7 is a block diagram illustrating a configuration of an arithmetic circuit according to an embodiment.

FIG. 6 is a logic table illustrating values input to and output from the internal circuits of FIG. 5.

Referring to FIG. 6, the arithmetic circuit may generate the arithmetic result value D by receiving the first arithmetic target value X, the second arithmetic target value Y, and the lower borrow digit value BI, and may detect the upper borrow digit value BO. In other words, the arithmetic driving circuit 100A (refer to FIG. 4), including the XNOR gate circuit 110A, the XOR gate circuit 120A, and the arithmetic output circuit 130A of FIG. 5, may generate the arithmetic result value D by receiving the first arithmetic target value X, the second arithmetic target value Y, and the lower borrow digit value BI. Furthermore, the detection output circuit 230A of FIG. 5 may detect the upper borrow digit value BO based on the inverted second arithmetic target value YB, the first intermediate result value V1, the second intermediate result value V2, and the inverted arithmetic result value DB.

The inverted second arithmetic target value YB input to the detection output circuit 230A may have substantially the same logic value as the output value of the first inversion circuit 111A. Furthermore, the inverted arithmetic result value DB input to the detection output circuit 230A may have substantially the same logic value as the output value of the second comparison circuit 122A. Accordingly, the first input circuit 210A that outputs the inverted second arithmetic target value YB and the second input circuit 220A that outputs the inverted arithmetic result value DB may be removed from the circuit configuration. This is more specifically described with reference to FIGS. 7 to 9.

FIG. 7 is a block diagram illustrating a configuration of an arithmetic circuit according to an embodiment.

Referring to FIG. 7, the arithmetic circuit may include an arithmetic driving circuit 100B and a detection circuit 200B.

First, the arithmetic driving circuit 100B may be an element for generating an arithmetic result value D based on a first arithmetic target value X, a second arithmetic target value Y, and a lower borrow digit value BI. In this case, the first arithmetic target value X may correspond to a minuend value. The second arithmetic target value Y may correspond to a subtrahend value. The lower borrow digit value BI may correspond to a borrow digit value required for a lower bit based on a currently calculated cipher. The arithmetic driving circuit 100B may generate an inverted second arithmetic target value YB, first and second intermediate result values V1 and V2, and an inverted arithmetic result value DB, and may provide the inverted second arithmetic target value YB, the first and second intermediate result values V1 and V2, and the inverted arithmetic result value DB to the detection circuit 200B. As will be described later with reference to FIG. 9, the inverted second arithmetic target value YB, the first and second intermediate result values V1 and V2, and the inverted arithmetic result value DB may be signals generated within the arithmetic driving circuit 100B.

The detection circuit 200B may be an element for detecting whether an upper borrow digit value BO occurs, by receiving the inverted second arithmetic target value YB and the first and second intermediate result values V1 and V2, that is, intermediate result values generated within the arithmetic driving circuit 100B, and the inverted arithmetic result value DB received as feedback and corresponding to the arithmetic result value D. In this case, the upper borrow digit value BO may correspond to a borrow digit value transferred as an upper bit based on a currently calculated cipher.

The arithmetic circuit according to an embodiment may include the arithmetic driving circuit 100B and the detection circuit 200B. In this case, the arithmetic driving circuit 100B may internally generate the inverted second arithmetic target value YB, the first and second intermediate result values V1 and V2, and the inverted arithmetic result value DB used to generate the arithmetic result value D. Furthermore, the detection circuit 200B may have a structure for generating the upper borrow digit value BO by receiving the inverted second arithmetic target value YB and the first and second intermediate result values V1 and V2 generated within the arithmetic driving circuit 100B, and the inverted arithmetic result value DB received as feedback. As will be described later again, the arithmetic circuit according to an embodiment has a smaller number of internal circuits, and thus can achieve a higher operation speed corresponding to the smaller number of internal circuits.

Figure 8:
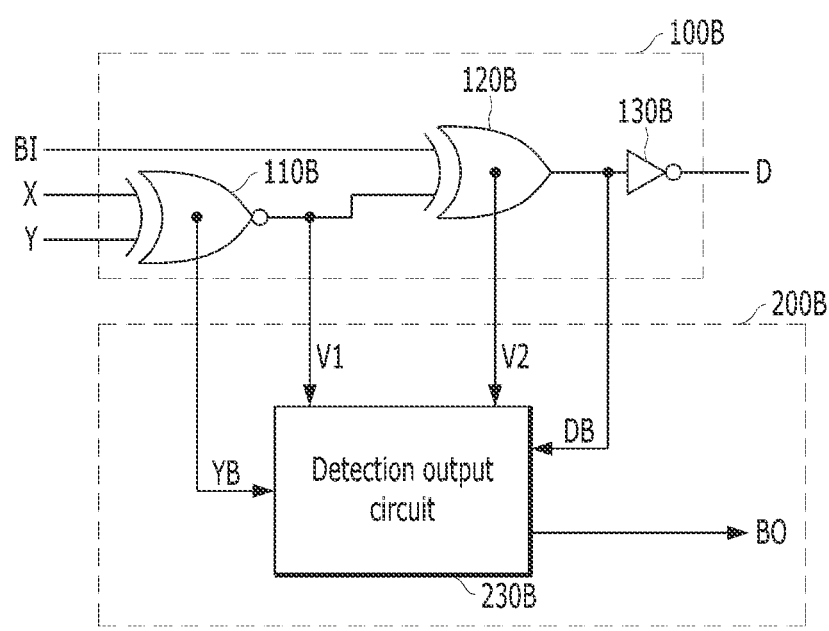
FIG. 8 is a diagram illustrating a configuration of some logic gates of the arithmetic circuit of FIG. 7.

FIG. 8 is a diagram illustrating a configuration of some logic gates of the arithmetic circuit of FIG. 7.

Referring to FIG. 8, the arithmetic driving circuit 100B may be an element for generating the arithmetic result value D based on the first arithmetic target value X, the second arithmetic target value Y, and the lower borrow digit value BI. The arithmetic driving circuit 100B may include an XNOR gate circuit 110B, an XOR gate circuit 120B, and an arithmetic output circuit 130B. The XNOR gate circuit 110B, the XOR gate circuit 120B, and the arithmetic output circuit 130B are elements corresponding to the XNOR gate circuit 110A, the XOR gate circuit 120A, and the arithmetic output circuit 130A of FIG. 4, respectively, and thus a detailed description thereof is omitted here.

In this case, the XNOR gate circuit 110B may internally generate the inverted second arithmetic target value YB. The XOR gate circuit 120B may generate the inverted arithmetic result value DB. This will be described in detail again with reference to FIG. 9.

The detection circuit 200B may be an element for detecting whether an upper borrow digit value BO occurs, based on the inverted second arithmetic target value YB, the first intermediate result value V1, the second intermediate result value V2, and the inverted arithmetic result value DB. The detection circuit 200B may include a detection output circuit 230B. The detection output circuit 230B is an element corresponding to the detection output circuit 230A of FIG. 4, and thus a detailed description thereof is omitted here.

In this case, the detection circuit 200B might not include the first input circuit 210A and the second input circuit 220A compared to the detection circuit 200A of FIG. 4. Accordingly, an operation speed of the arithmetic circuit can be increased and a circuit area can be reduced that much.

Figure 9:
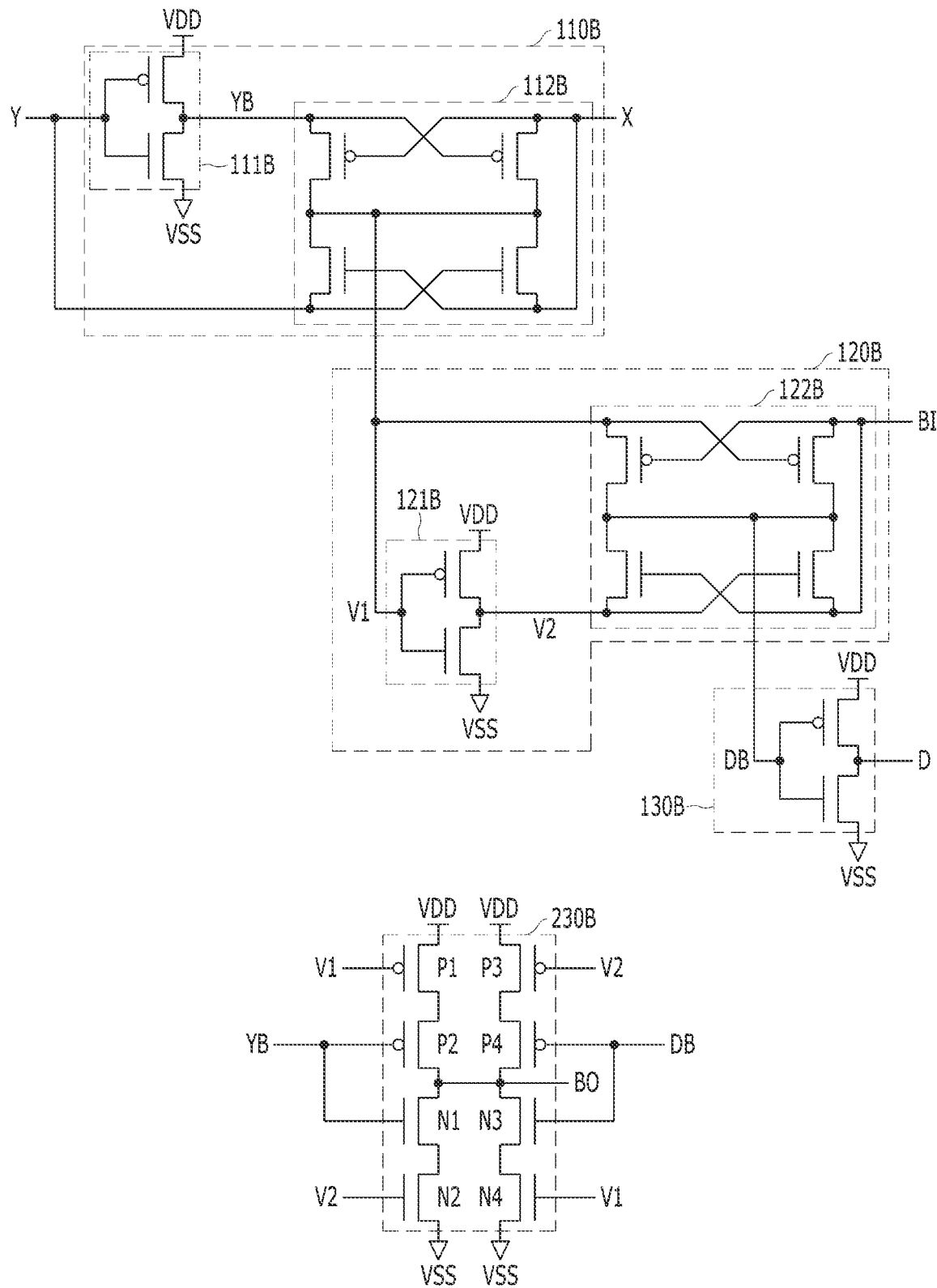
FIG. 9 is a circuit diagram illustrating a configuration of internal circuits of the arithmetic circuit of FIG. 8.

FIG. 9 is a circuit diagram illustrating a configuration of internal circuits of the arithmetic circuit of FIG. 8.

Referring to FIGS. 8 and 9, the arithmetic driving circuit 100B of the arithmetic circuit may include the XNOR gate circuit 110B, the XOR gate circuit 120B, and the arithmetic output circuit 130B.

First, the XNOR gate circuit 110B may include a first inversion circuit 111B and a first comparison circuit 112B. In this case, the first inversion circuit 111B may receive the second arithmetic target value Y and output the inverted second arithmetic target value YB by inverting the received second arithmetic target value Y. The first comparison circuit 112B may output the first intermediate result value V1 by logically comparing the inverted second arithmetic target value YB and the first and second arithmetic target values X and Y. The XOR gate circuit 120B may include a second inversion circuit 121B and a second comparison circuit 122B. In this case, the second inversion circuit 121B may receive the first intermediate result value V1 and output the second intermediate result value V2 by inverting the received first intermediate result value V1. The second comparison circuit 122B may output the inverted arithmetic result value DB by logically comparing the first and second intermediate result values V1 and V2 and the lower borrow digit value BI. The arithmetic output circuit 130B may output the arithmetic result value D by inverting the inverted arithmetic result value DB output by the XOR gate circuit 120B.

The detection circuit 200B of the arithmetic circuit may include the detection output circuit 230B.

In this case, the detection output circuit 230B may detect the upper borrow digit value BO based on the first intermediate result value V1, the inverted second arithmetic target value YB, the second intermediate result value V2, and the inverted arithmetic result value DB generated within the arithmetic driving circuit 100B. The internal elements of the detection output circuit 230B correspond to the internal elements of the detection output circuit 230A of FIG. 5, and thus a detailed description thereof is omitted here.

In this case, the inverted second arithmetic target value YB input to the detection output circuit 230B may be an output value of the first inversion circuit 111B, and the inverted arithmetic result value DB may be an output value of the second comparison circuit 122B. Accordingly, each of the second PMOS transistor P2 and the first NMOS transistor N1 may receive, through a gate thereof, the inverted second arithmetic target value YB output by the first inversion circuit 111B. Furthermore, each of the fourth PMOS transistor P4 and the third NMOS transistor N3 may receive, through a gate thereof, the inverted arithmetic result value DB output by the second comparison circuit 122B.

As can be seen from FIG. 9, the arithmetic circuit can achieve a higher operation speed because it can be configured with the 11 inverters. That is, the arithmetic circuit according to an embodiment can have a higher operation speed by further reducing or minimizing the number of internal circuits. Furthermore, the area occupied by the arithmetic circuit can be further reduced or minimized because the number of internal circuits used for the arithmetic circuit is further reduced or minimized.

An embodiment has an effect in that it can increase the operation speed of the arithmetic circuit by reducing or minimizing the number of internal circuits.

An embodiment has an effect in that it can reduce or minimize the area of the arithmetic circuit.

Effects of the present disclosure are not limited to the aforementioned effects, and other effects not described above may be evidently understood by those skilled in the art, to which the present disclosure pertains, from the above description.

Although various embodiments have been described for illustrative purposes, it will be apparent to those skilled in the art that various changes and modifications may be made without departing from the spirit and scope of the disclosure as defined in the following claims.

What is claimed is:

1. An arithmetic circuit comprising:
   an arithmetic driving circuit configured to generate an arithmetic result value based on first and second arithmetic target values and a lower borrow digit value; and
   a detection circuit configured to detect whether an upper borrow digit value occurs based on the arithmetic result value received as feedback, the second arithmetic target value, and an intermediate result value of the arithmetic driving circuit,
   wherein the arithmetic driving circuit comprises:
   an exclusive NOR (XNOR) gate circuit configured to receive the first arithmetic target value and the second arithmetic target value and to output a first intermediate result value, which is the intermediate result value, by performing an XNOR logic operation on the first arithmetic target value and the second arithmetic target value;

an exclusive OR (XOR) gate circuit configured to receive the first intermediate result value and the lower borrow digit value and output an output value by performing an XOR logic operation on the first intermediate result value and the lower borrow digit value; and an arithmetic output circuit configured to receive the output value of the XOR gate circuit and output the arithmetic result value by inverting the received output value.

2. The arithmetic circuit of claim 1, wherein:
the first arithmetic target value comprises a minuend value, and
the second arithmetic target value comprises a subtrahend value.

3. The arithmetic circuit of claim 1, wherein the XNOR gate circuit comprises:
a first inversion circuit configured to receive the second arithmetic target value and to output an output value by inverting the received second arithmetic target value; and
a first comparison circuit configured to output the first intermediate result value by logically comparing the output value of the first inversion circuit and the first and second arithmetic target values.

4. The arithmetic circuit of claim 3, wherein the XOR gate circuit comprises:
a second inversion circuit configured to receive the first intermediate result value and output a second intermediate result value by inverting the received first intermediate result value; and
a second comparison circuit configured to output a result value by logically comparing the first and second intermediate result values and the lower borrow digit value.

5. The arithmetic circuit of claim 1, wherein the detection circuit comprises:
a first input circuit configured to receive the second arithmetic target value and output an inverted second arithmetic target value by inverting the received second arithmetic target value;
a second input circuit configured to output an inverted arithmetic result value by inverting the arithmetic result value; and
a detection output circuit configured to output the upper borrow digit value based on the intermediate result value, the inverted second arithmetic target value, and the inverted arithmetic result value.

6. The arithmetic circuit of claim 5, wherein the detection output circuit comprises:
a first MOS transistor coupled in series between a power supply voltage stage and a ground voltage stage and configured to receive, through a gate thereof, a first intermediate result value which is the intermediate result value,
second and third MOS transistors each configured to receive, through a gate thereof, the inverted second arithmetic target value,
a fourth MOS transistor configured to receive, through a gate thereof, a second intermediate result value which is the intermediate result value; and
a fifth MOS transistor coupled in series between the power supply voltage stage and the ground voltage stage and configured to receive, through a gate thereof, the second intermediate result value, and sixth and the seventh MOS transistors each configured to receive, through a gate thereof, the inverted arithmetic result value, and an eighth MOS transistor configured to receive, through a gate thereof, the first intermediate result value, wherein drains of the second MOS transistor and the sixth MOS transistor are coupled to a common node from which the upper borrow digit value is output.

7. An arithmetic circuit comprising:
an arithmetic driving circuit configured to generate an arithmetic result value based on first and second arithmetic target values and a lower borrow digit value; and
a detection circuit configured to receive an inverted second arithmetic target value and an intermediate result value generated within the arithmetic driving circuit and to detect whether an upper borrow digit value occurs, based on an inverted arithmetic result value received as feedback and corresponding to the arithmetic result value.

8. The arithmetic circuit of claim 7, wherein:
the first arithmetic target value comprises a minuend value, and
the second arithmetic target value comprises a subtrahend value.

9. The arithmetic circuit of claim 7, wherein the arithmetic driving circuit comprises:
an exclusive NOR (XNOR) gate circuit configured to receive the first arithmetic target value and the second arithmetic target value and to output a first intermediate result value, which is the intermediate result value, by performing an XNOR logic operation on the first arithmetic target value and the second arithmetic target value;
an exclusive OR (XOR) gate circuit configured to receive the first intermediate result value and the lower borrow digit value and output the inverted arithmetic result value by performing an XOR logic operation on the received first intermediate result value and lower borrow digit value; and
an arithmetic output circuit configured to receive the inverted arithmetic result value and output the arithmetic result value by inverting the received inverted arithmetic result value.

10. The arithmetic circuit of claim 9, wherein the XNOR gate circuit comprises:
a first inversion circuit configured to receive the second arithmetic target value and output the inverted second arithmetic target value by inverting the received second arithmetic target value; and
a first comparison circuit configured to output the first intermediate result value by logically comparing the inverted second arithmetic target value and the first and second arithmetic target values.

11. The arithmetic circuit of claim 10, wherein the XOR gate circuit comprises:
a second inversion circuit configured to receive the first intermediate result value and output a second intermediate result value, which is the intermediate result value, by inverting the received first intermediate result value; and
a second comparison circuit configured to output the inverted arithmetic result value by logically comparing the first and second intermediate result values and the lower borrow digit value.

12. The arithmetic circuit of claim 7, wherein the detection circuit outputs the upper borrow digit value based on the inverted second arithmetic target value, the intermediate result value, and the inverted arithmetic result value.

13. The arithmetic circuit of claim 7, wherein the detection circuit comprises:
- a first MOS transistor coupled in series between a power supply voltage stage and a ground voltage stage and configured to receive, through a gate thereof, a first intermediate result value which is the intermediate result value,
- second and third MOS transistors each configured to receive, through a gate thereof, the inverted second arithmetic target value,
- a fourth MOS transistor configured to receive, through a gate thereof, a second intermediate result value which is the intermediate result value; and
- a fifth MOS transistor coupled in series between the power supply voltage stage and the ground voltage stage and configured to receive, through a gate thereof, the second intermediate result value, and
- sixth and the seventh MOS transistors each configured to receive, through a gate thereof, the inverted arithmetic result value, and
- an eighth MOS transistor configured to receive, through a gate thereof, the first intermediate result value,
- wherein drains of the second MOS transistor and the sixth MOS transistor are coupled to a common node from which the upper borrow digit value is output.

* * * * *